US008023826B2

(12) United States Patent
Fasshauer et al.

(10) Patent No.: US 8,023,826 B2
(45) Date of Patent: Sep. 20, 2011

(54) METHOD AND APPARATUS FOR USING DISTRIBUTED ANTENNAS

(75) Inventors: David Fasshauer, Harwood Heights, IL (US); Tormod Larsen, Geneva, IL (US); Eric Lekacz, Glen Ellyn, IL (US)

(73) Assignee: Extenet Systems Inc., Lisle, IL (US)

( * ) Notice: Subject to any disclaimer, the term of this patent is extended or adjusted under 35 U.S.C. 154(b) by 964 days.

(21) Appl. No.: 11/861,628

(22) Filed: Sep. 26, 2007

(65) Prior Publication Data

US 2008/0212969 A1    Sep. 4, 2008

Related U.S. Application Data

(60) Provisional application No. 60/827,028, filed on Sep. 26, 2006.

(51) Int. Cl.
*H04B 10/00* (2006.01)
(52) U.S. Cl. ............... 398/116; 398/115; 398/117
(58) Field of Classification Search ........... 398/115–117
See application file for complete search history.

(56) References Cited

U.S. PATENT DOCUMENTS

| | | | | |
|---|---|---|---|---|
| 5,867,485 | A * | 2/1999 | Chambers et al. | 370/281 |
| 6,232,928 | B1 * | 5/2001 | Zimmerman et al. | 343/882 |
| 6,353,600 | B1 * | 3/2002 | Schwartz et al. | 370/328 |
| 2001/0036163 | A1 * | 11/2001 | Sabat et al. | 370/328 |
| 2002/0181444 | A1 | 12/2002 | Acampora | |
| 2003/0137454 | A1 * | 7/2003 | Alexander | 342/442 |
| 2003/0226071 | A1 * | 12/2003 | Millar | 714/712 |
| 2005/0238311 | A1 * | 10/2005 | Forrester | 385/136 |

OTHER PUBLICATIONS

International Search Report dated Mar. 31, 2008.

* cited by examiner

*Primary Examiner* — Dzung D Tran
(74) *Attorney, Agent, or Firm* — McDonnell Boehnen Hulbert & Berghoff LLP

(57) ABSTRACT

A distributed antenna system for using distributed antennas provides for locating a plurality of distributed antennas on existing infrastructure such as existing utility poles, traffic lights/signals, streetlights, etc. Each of the distributed antennas is connected to a base station hotel using a fiber optic cable. The distributed antenna system allows users to access wireless services provided by a plurality of carriers and using a plurality of communication technologies using a truly shared network and without having to implement duplicative wireless infrastructure components.

9 Claims, 15 Drawing Sheets

METHOD AND APPARATUS FOR USING DISTRIBUTED ANTENNAS

CROSS-REFERENCE TO RELATED APPLICATIONS

This application is based on and claims the benefit of U.S. Provisional Patent Application No. 60/827,028 filed on Sep. 26, 2006 and entitled "A Method and Apparatus for Using Distributed Antenna," which is incorporated herein by reference in its entirety.

FIELD

This patent generally relates to telecommunications and specifically to equipment used in distributed antenna systems used in radio frequency telecommunication.

BACKGROUND

In recent years, the telecommunications industry has experienced rapid growth by offering a variety of new and improved services to customers. This growth has been particularly notable in the area of wireless communications, e.g., cellular and mobile radio systems. One of the factors that have led to the rapid growth in the wireless arena is the objective of allowing a user to be reached any time, and anywhere. Unfortunately, the industry has not been able to reach this goal even though large and small companies and various consortiums are frantically building vast networks in an effort to capture a share of this booming market.

Despite their efforts to provide seamless and blanket coverage for wireless telecommunications, some areas remain inaccessible. Moreover, due to a large number of wireless service providers trying to provide wireless services using a number of different telecommunication technologies, it is often necessary to install large amount of telecommunication equipment, including a number of antennas and cables connecting thereto, in a service area. Such solutions result in having unappealing wireless antenna structures that often ruin the natural looks of the area where such antennas are located.

For the reasons stated above, and for other reasons stated below which will become apparent to those skilled in the art upon reading and understanding the present specification, there is a need in the art for an economically viable system and method for using distributed antennas in an efficient manner.

BRIEF DESCRIPTION OF THE DRAWINGS

While the appended claims set forth the features of the present patent with particularity, the patent, together with its objects and advantages, may be best understood from the following detailed description taken in conjunction with the accompanying drawings, of which:

DETAILED DESCRIPTION

A distributed antenna system for using distributed antennas provides for locating a plurality of distributed antennas on existing infrastructure such as existing utility poles, traffic lights/signals, streetlights, etc. Each of the distributed antennas is connected to a base station hotel using a fiber optic cable. The distributed antenna system allows users to access wireless services provided by a plurality of carriers and using a plurality of communication technologies using a truly shared network and without having to implement duplicative wireless infrastructure components.

Figure 1:
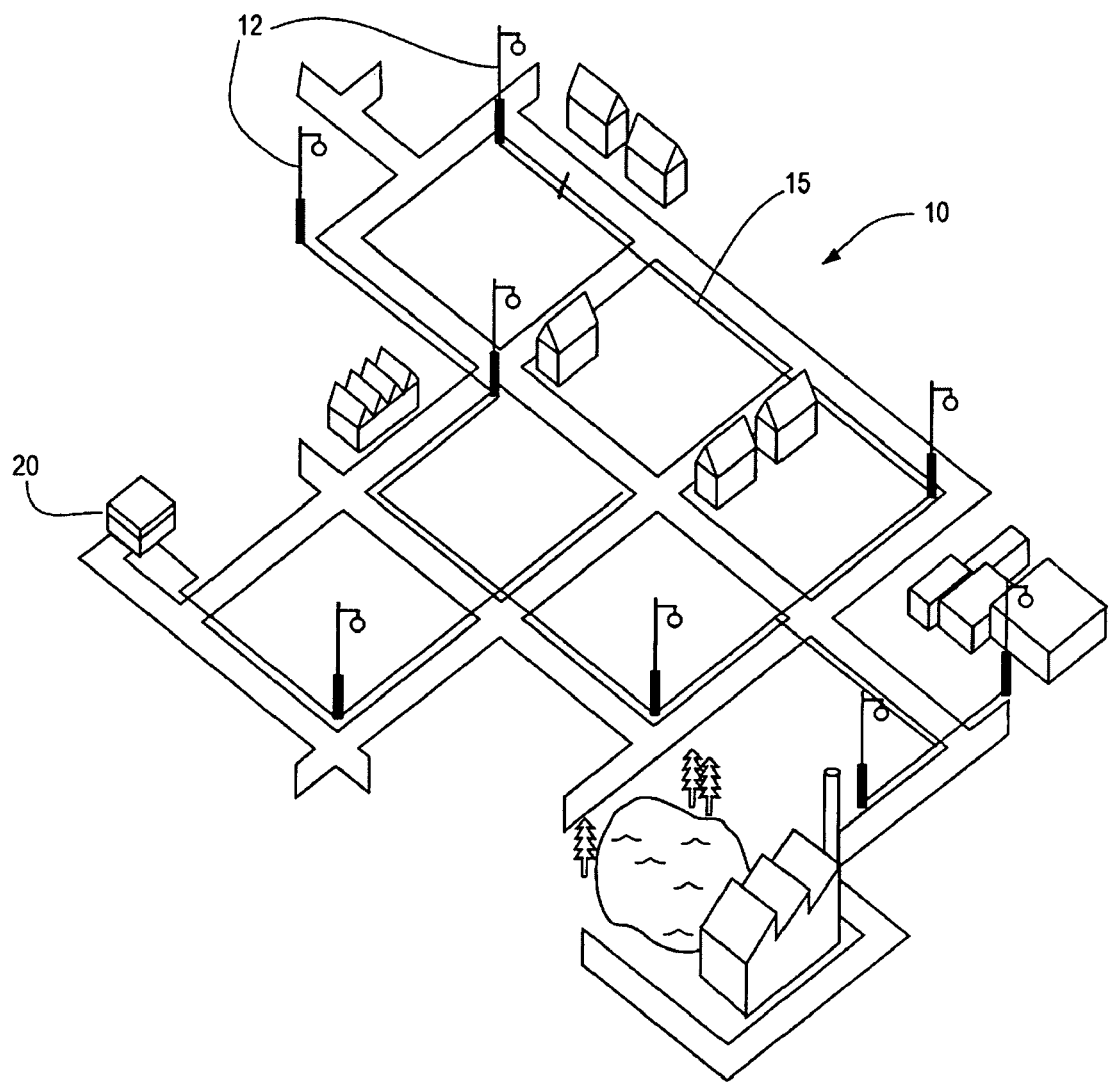
FIG. 1 illustrates an example block diagram of a distributed antenna system (DAS)

Now referring to the attached figures, FIG. 1 illustrates an example block diagram of a distributed antenna system (DAS) 10. As shown in FIG. 1, the DAS includes a plurality of small antennas (remote nodes) 12 placed on existing utility poles, streetlights, traffic signals, bus stops, etc. Each of the plurality of Antennas is connected via a fiber optic cable 15 to a base station located in an existing facility. The DAS 10 may consist of the following major elements: A base station hotel 20: The base station hotel 20 may be a central location where all wireless service provider equipment may be installed. The base station hotel 20 may also contain Optical Conversion equipment.

The Optical Conversion equipment may convert the RF signal from a wireless service provider equipment to an optical signal. Subsequently, this optical signal may be routed via fiber optic cable to specific remote node locations.

Each remote node may then convert the optical signal back to a wireless radio frequency (RF) signal. This RF signal is transmitted over a small unobtrusive antenna that is typically mounted on a utility pole, light post, bus stop or other type of existing municipality infrastructure. This single antenna broadcasts the signal for all wireless service provider technologies.

Once the DAS 10 is implemented, the fiber 15 may serve as the backbone for the network. The base station hotel 20 may be in an existing building to centrally locate all wireless service providers and other equipment necessary to communicate information from the wireless service providers to the plurality of antennas 12 and vice-versa. The DAS 10 may be implemented in a manner so as to support multiple wireless service providers and technologies.

The DAS 10 implementation as provided in here enables wireless service providers to centralize their equipment in the base station hotel 20. The implementation of DAS 10 disclosed herein may be extended by adding a remote node. The flexibility to add additional remote nodes allows the DAS to cover holes in wireless network coverage and in-building dead spots.

The network architecture of DAS 10 significantly reduces interference across the network. The interference picture improves because the remote nodes 12 that are transmitting the RF signal from the base station hotel 20 are typically 30-40 feet from ground level. This low transmitting height provides natural signal isolation and helps reduce interference. Power levels are also significantly reduced, which further minimizes the potential for interference.

Additionally, the DAS network 10 supports a number of different communication technologies. Moreover, new technologies and services such as 3G, UMTS, CDMA-2000, 4G, and 802.11 can be implemented by simply adding the required base transceiver station (BTS) equipment at the base station hotel 20. This provides for immediate provisioning of new services. More importantly, the DAS Network architecture disclosed herein eliminates retrofitting of existing sites or addition of new sites with every new generation of technology.

Figure 2:
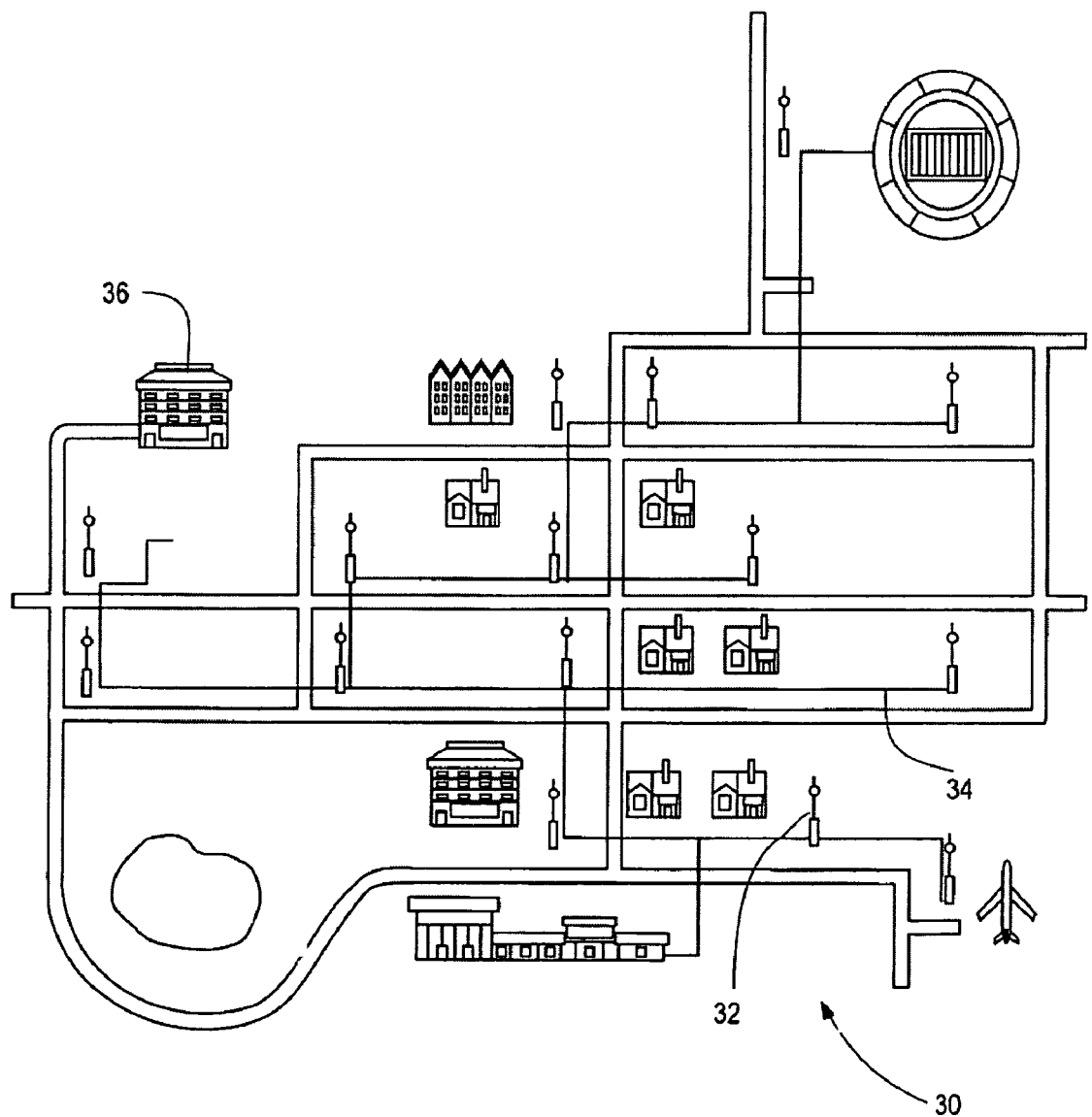
FIG. 2 illustrates an illustrates an alternate implementation of a DAS network.

FIG. 2 illustrates an alternate implementation of the DAS network 30 having a number of small node antennas 32 located on existing utility poles, streetlights, traffic signals, etc., connected via a fiber optic network 34 to a base station hotel 36. As shown in FIG. 2, the DAS network 30 may be employed in a community having existing infrastructure without having to implement any additional mounting structure. As one of ordinary skill in the art would appreciate, because the DAS network 10 uses existing infrastructure, it is possible to provide wireless communication in a community without erecting any aesthetically unpleasant antenna poles, rooftop antennas, etc.

DAS networks as illustrated in FIGS. 1 and 2 may provide a number of significant economic, performance and operational advantages for wireless service providers. For example, the DAS network is efficient in its implementation as it does not require deployment of additional antenna mounting structures, thus efficiently using the technical personnel for operations and maintenance. The implementation of DAS networks as illustrated in FIGS. 1 and 2 significantly reduces utility and telecommunication costs to the wireless service providers by, among other things, elimination of construction and site acquisition costs for multiple sites to add capacity. Other advantages of the DAS networks include increased spectrum efficiency, reduction in repetitive site acquisition costs for unsuccessful sites, reduced future base station infrastructure deployment costs, reduced need to build costly, difficult and sometimes impossible conventional sites, to sustain capacity/quality, etc.

The DAS networks as illustrated in FIGS. 1 and 2 may also provide a number of significant technical benefits, such as enhanced quality of coverage with less fading effect, increased spectrum efficiency, ability to add and manage capacity centrally from the base station hotel, allowing for specific tailored coverage to address existing RF holes in the network, elimination of a majority of ongoing drive testing to verify RF performance, ability to have multiple network configurations for specific events or seasonal shifts in traffic, etc.

Moreover the operational benefits of the DAS networks illustrated in FIGS. 1 and 2 include efficient use of technical personnel for operations and maintenance, reduction in utility and telecommunication cost management requirements, easy troubleshooting and response to network problems, central implementation of all radio resource capacity enhancements at the base station hotel, central DTS maintenance at the base station hotel, significant reduction in spare parts inventory, repair costs and personnel requirements, elimination of access issues for maintenance and repair, elimination of costly network inventory and audit costs, etc.

Similarly, quality & availability benefits of the DAS networks illustrated in FIGS. 1 and 2 include improved network quality and availability due to elimination of a majority of telecommunication (T1) connections, a significant reduction in dropped calls, ease of troubleshooting facilitating rapid response and resolution of network problems; etc. In such implementations, a loss of a network component affects a much smaller geographic area. Moreover, it is possible to provide a line of sight network that provides a ubiquitous RF coverage blanket.

The flexibility & adaptability benefits of the DAS networks include their ability to respond to end-user market dynamics by moving capacity as needed and ability to add subscriber "Load" to the network and deploy new technologies without worrying about an increase in operating expense. By using the DAS networks as disclosed, the need to build costly, difficult and sometimes impossible conventional sites, to sustain capacity and/or quality is obviated and it allows all required radio resource capacity enhancements or modifications to be quickly implemented at the base station hotel. Furthermore, the DAS network provides a platform for easy and rapid deployment of new technologies. In terms of aesthetics, the compact nature of the equipment required in building the DAS networks satisfies aesthetic concerns of communities and their residents and reduces the requirement for towers and rooftop antennas, which in turn, helps improve or maintain overall community aesthetics. Especially, the common fiber backbone addresses aesthetic concerns by reducing the "guitar string" effect of multiple fiber strands on utility infrastructure, thus alleviating citizen concerns regarding the proliferation of unsightly wireless infrastructure.

Figure 3:
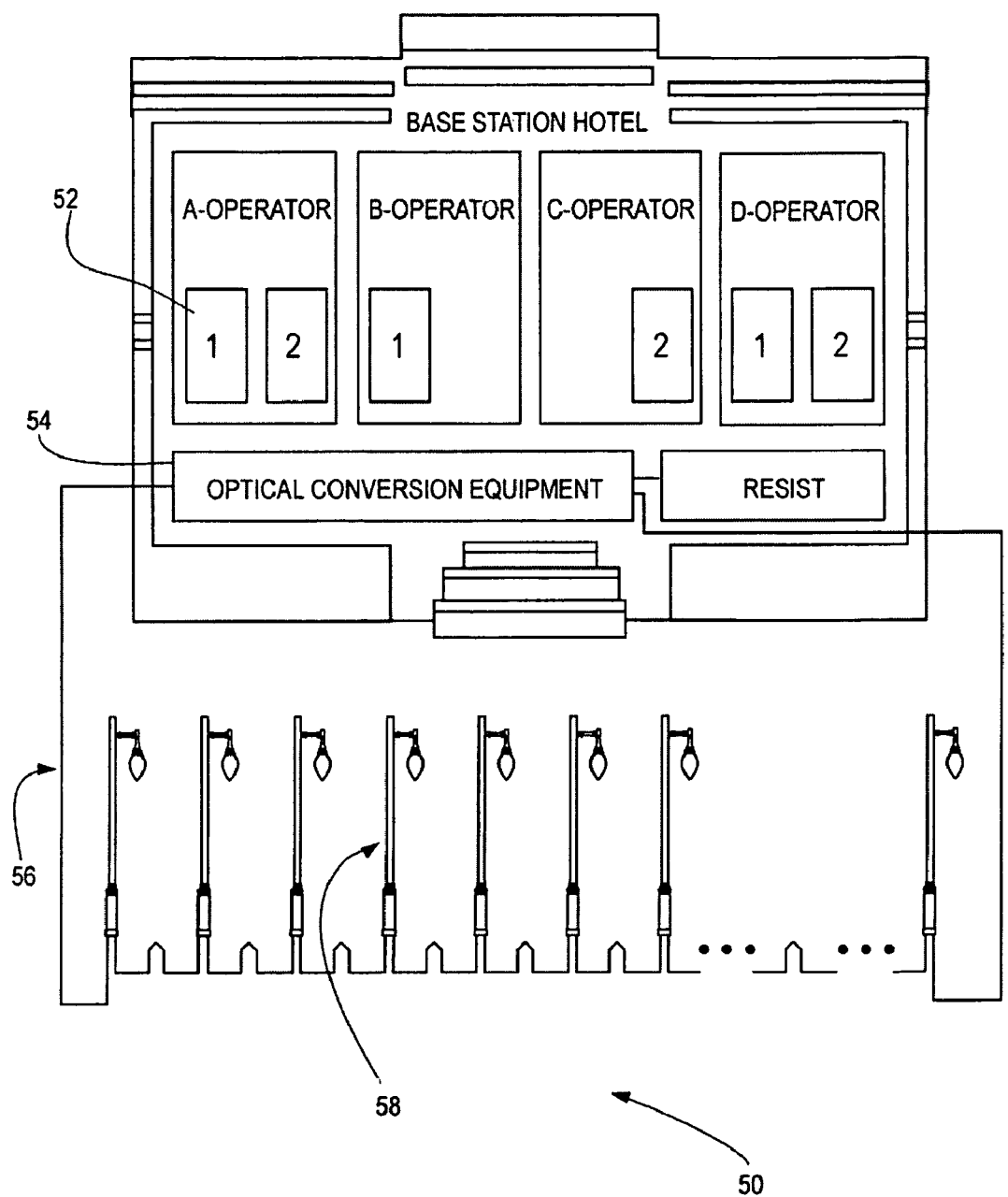
FIG. 3 illustrates a configuration of a multi-operator DAS base station hotel.

Now referring to FIG. 3, it illustrates a configuration of a multi-operator DAS base station hotel 50. As illustrated the base station hotel 50 may include BTS equipment 52 from a plurality of service providers. The signal received from the BTS equipment is converted into optical signal by an optical-conversion equipment 54 and routed to a fiber 56 connected to a plurality of remote nodes 58. Such remote nodes may be located on existing utility poles, streetlights, traffic signals, etc.

Figure 4:
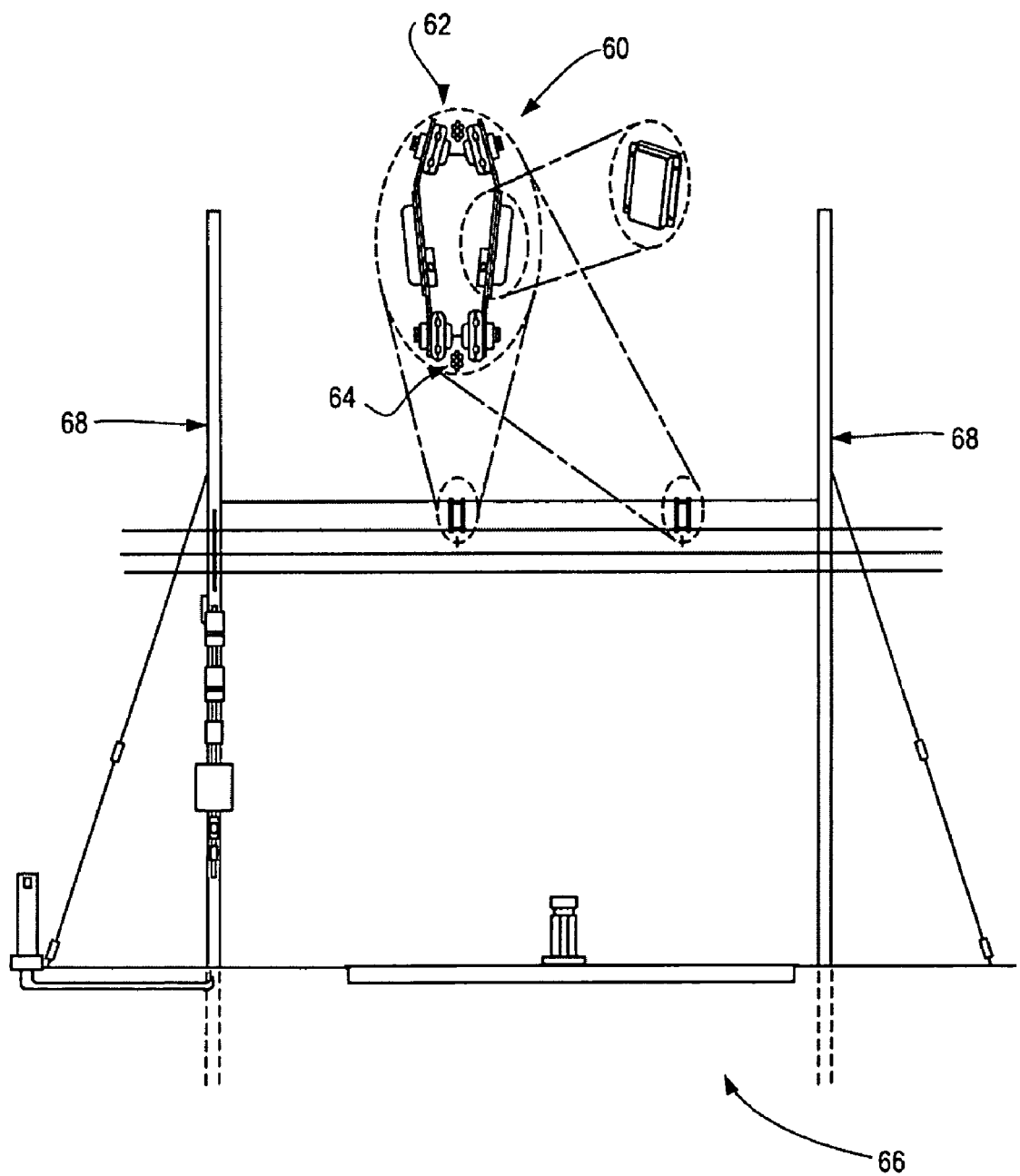
FIG. 4 illustrates an alternate implementation of a DAS using an antenna mounting bracket located over a roadway.

Note that while in FIGS. 1 to 3, the remote nodes are shown to be located on existing utility poles or streetlights, in alternate embodiment, such remote nodes may also be located on mid-span of cables connecting two poles. Specifically FIG. 4 illustrates an antenna-mounting bracket 60 that may be clamped on the lift strand 62 and messenger strand 64 hanging over a roadway 66. The lift strand 62 and the messenger strand 64 may be supported by poles 68 located on two sides of a roadway 66. Additionally, the messenger strand 64 may be used to carry a coaxial cable and/or a fiber to and from the antennas located on the mounting bracket 60.

Figure 5:
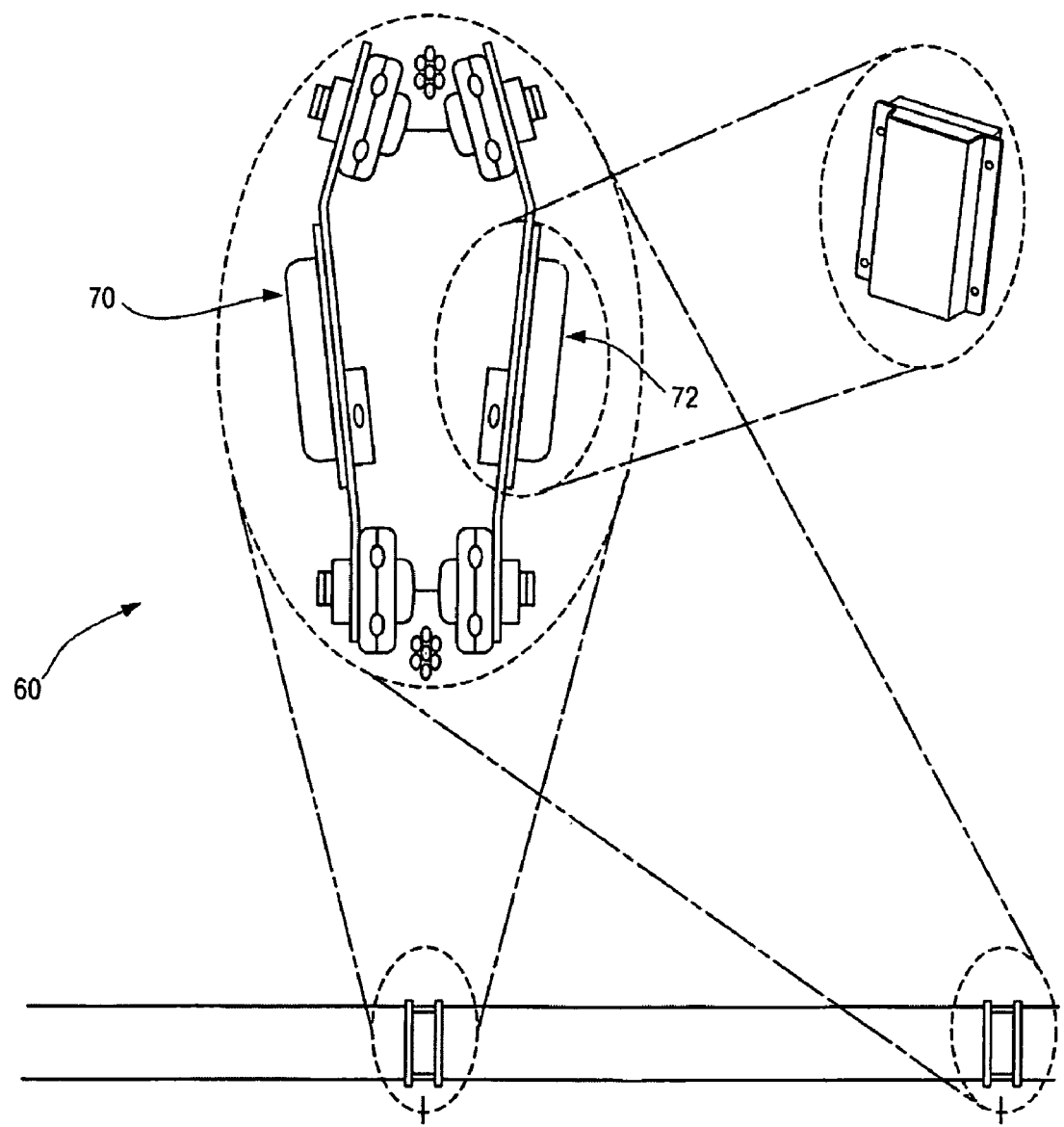
FIG. 5 provides a more detailed illustration of the mounting bracket used in FIG. 4.

FIG. 5 provides a more detailed illustration of the mounting bracket 60 showing two antennas 70, 72 located on two sides of the mounting bracket. The antennas may be directional and located on the mounting bracket so as to face the roadway in opposite directions. Such deployment of the antennas provides coverage of wireless communication over a span of the roadway and as one of ordinary skill in the art would appreciate, deployment of a series of such antennas at periodic distances over a roadway may be used to provide wireless communication over the entire roadway. Note that in an alternate embodiment, the mounting bracket 60 may be designed so as to carry four antennas on four sides, in which case, such a mounting bracket may be located at the center of an intersection to provide wireless signals in each of the four directions. Other multidirectional mounting brackets may also be provided.

Figure 6:
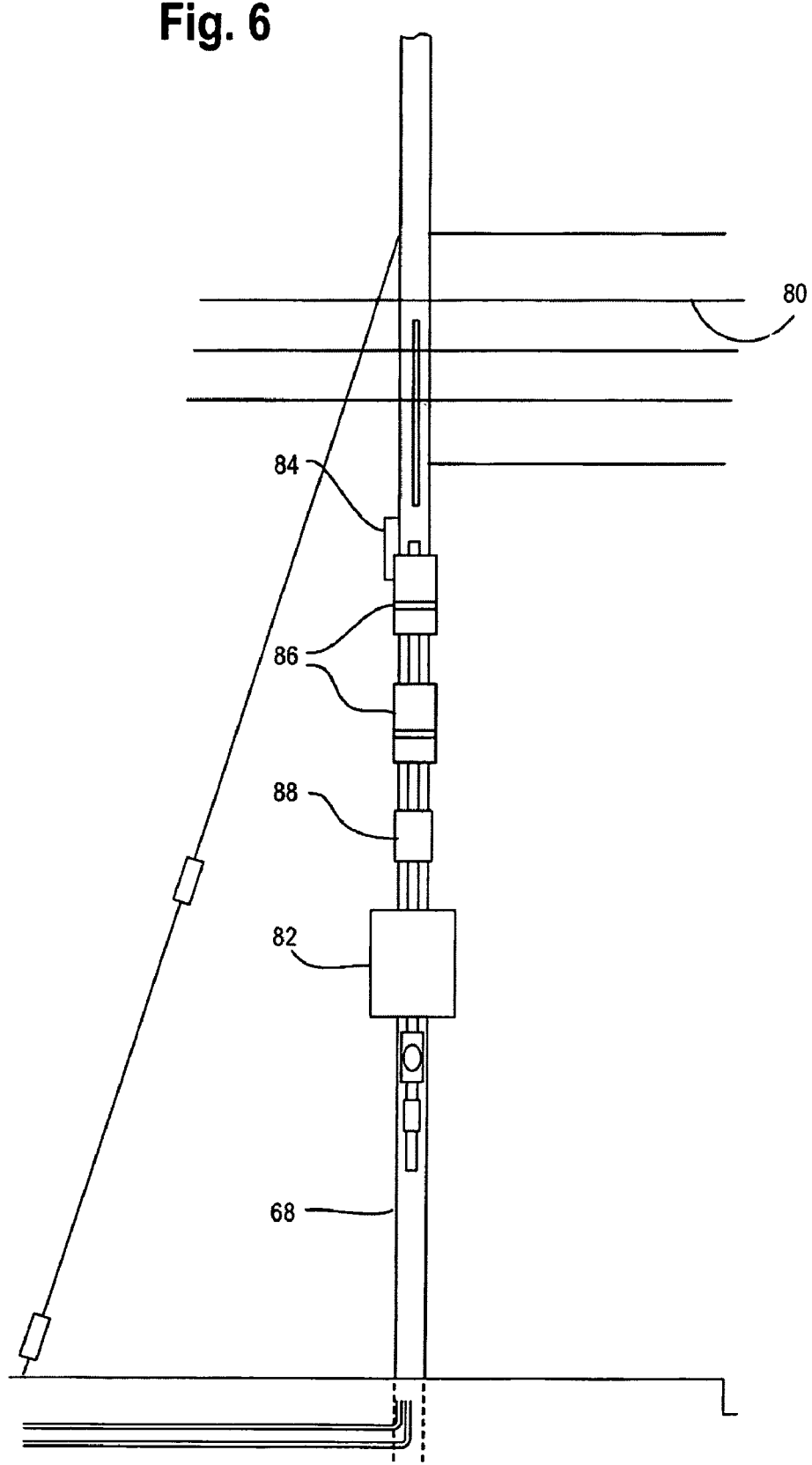
FIG. 6 illustrates node equipment located on a pole for communicating with a mid-span antenna of FIG. 4.
Figure 7:
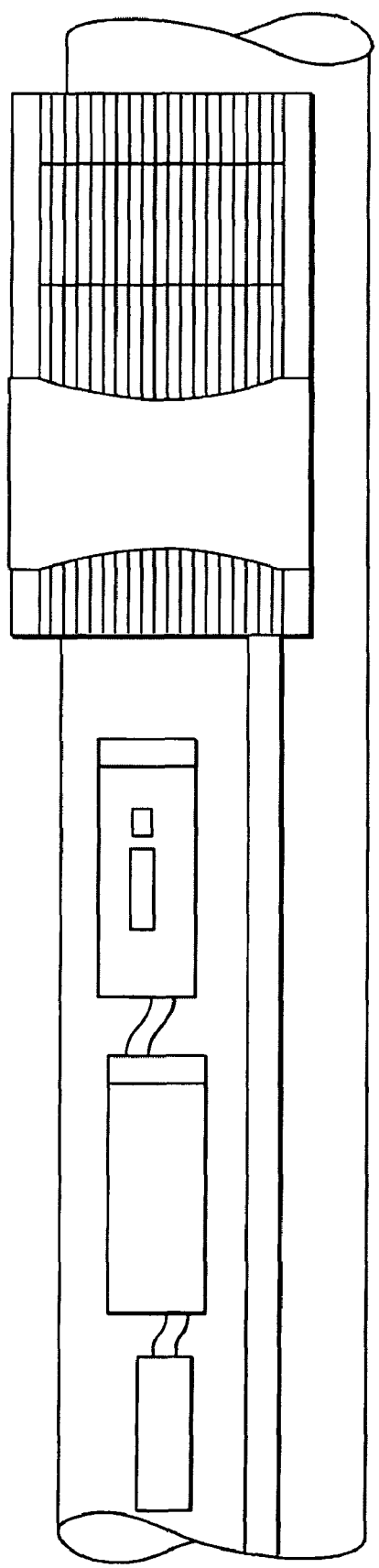
FIG. 7 illustrates actual implementation of such equipment on a pole as illustrated in FIG. 6.

The antennas located on the mounting bracket 60 may be connected to a base station hotel using a plurality of telecommunication equipment located on one of the poles 68. FIG. 6 illustrates various node equipment located on a pole for communicating with such mid-span based antenna. Specifically, FIG. 6 illustrates that a fiber 80 connected to a base band unit (BBU) 82 via, among other things, a fiber storage box 84, repeaters 86 and a hybrid combiner 88. FIG. 7 illustrates actual implementation of such equipment on a pole.

Figure 8:
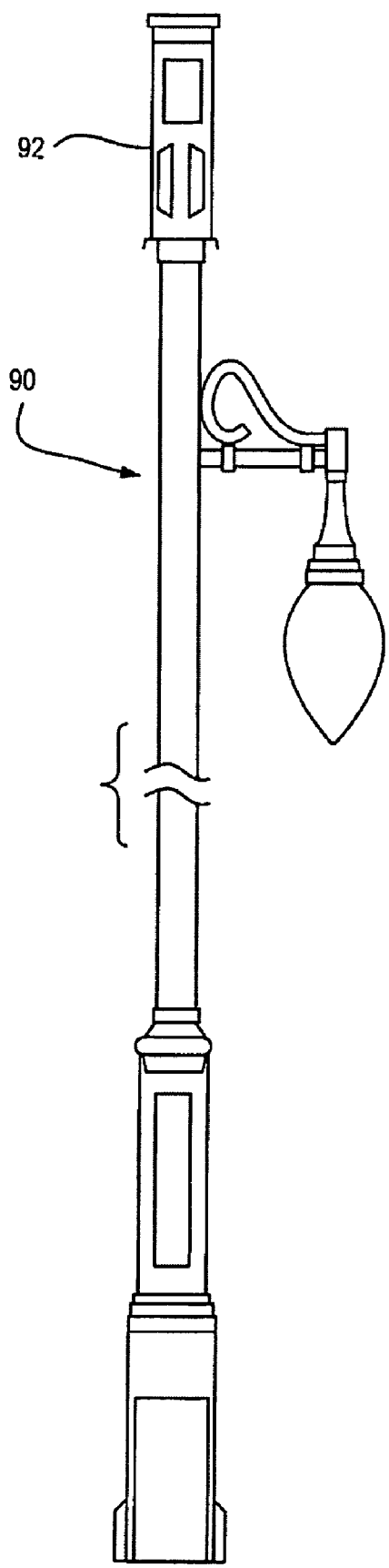
FIG. 8 illustrates an alternate implementation of an antenna in a DAS.
Figure 9:
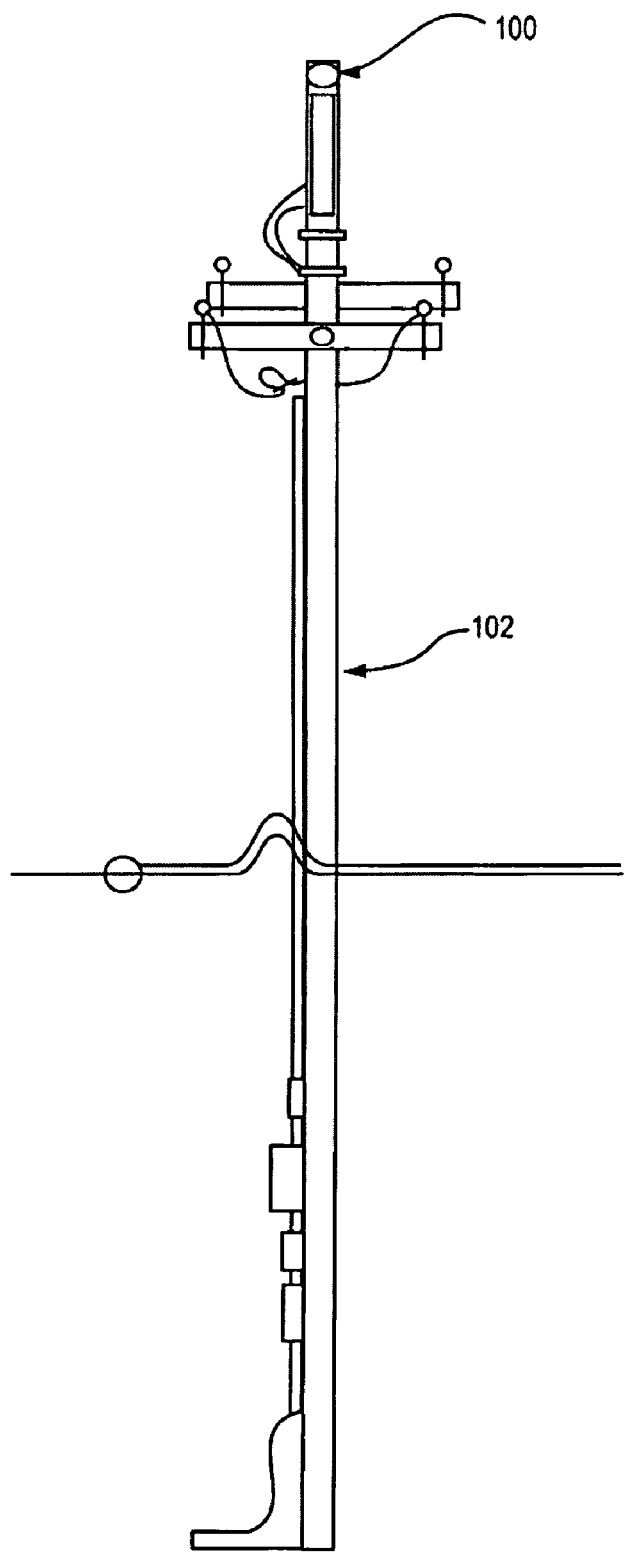
FIG. 9 illustrates yet another implementation of an antenna located on a utility pole.

Now referring to FIG. 8, in an alternate implementation of an antenna in a DAS, the RF equipment, such as the BBU, etc., may be mounted internally to a lamppost 90, whereas the antenna 92 may be located on the top of the lamppost 90. The locating of antenna on the lamppost 90 as illustrated in FIG. 8 allows keeping the aesthetic look of the lamppost 90 while providing infrastructure necessary to provide RF transmission over a desired area. A yet another implementation of an antenna in a DAS is illustrated in FIG. 9, wherein an antenna cluster 100 is located on top of a utility pole 102.

Figure 10:
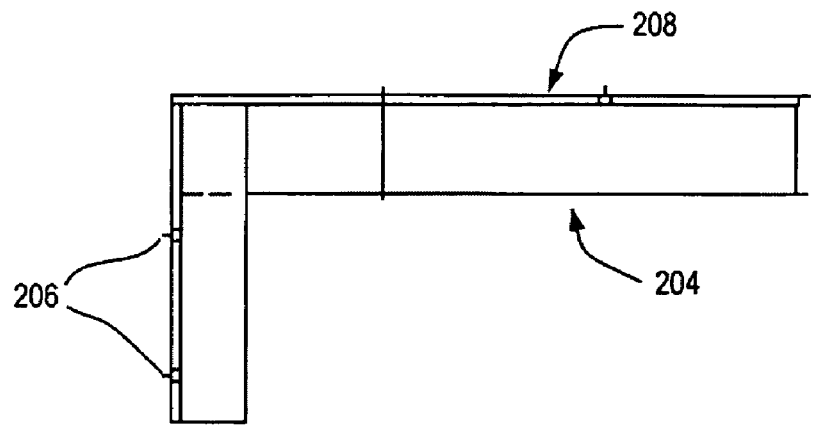
FIG. 10 illustrates an embodiment of a bracket holder that may be used to install an antenna on a pole.
Figure 10:
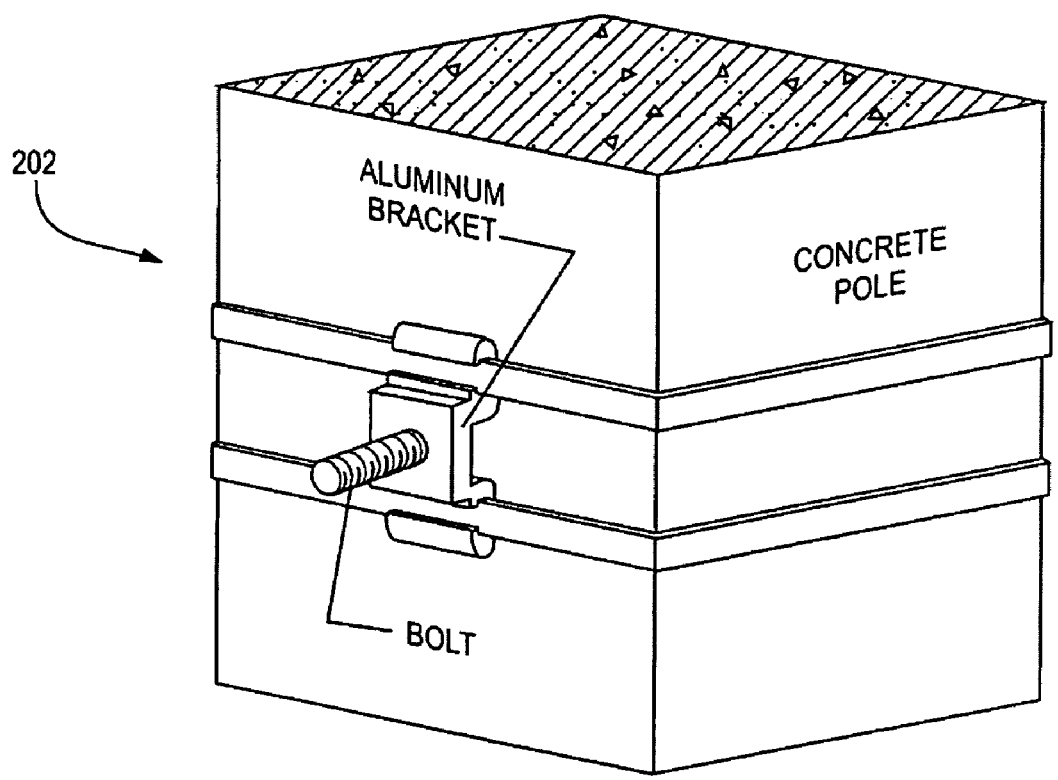

FIG. 10 illustrates an embodiment of a bracket holder 202 that may be used to install an antenna on a pole. While the bracket holder 202 is made of aluminum in an alternate embodiment the bracket may be made of any alternate material. The bracket 202 holder may be installed on a concrete pole, on a wooden pole, or any other kind of pole. The bracket holder 202 may be used with a support bracket 204 that may connect to the bracket holder 202 via holes 206 or by some alternate means. An antenna may be installed on the top surface 208 of the support bracket 204.

Figure 11:
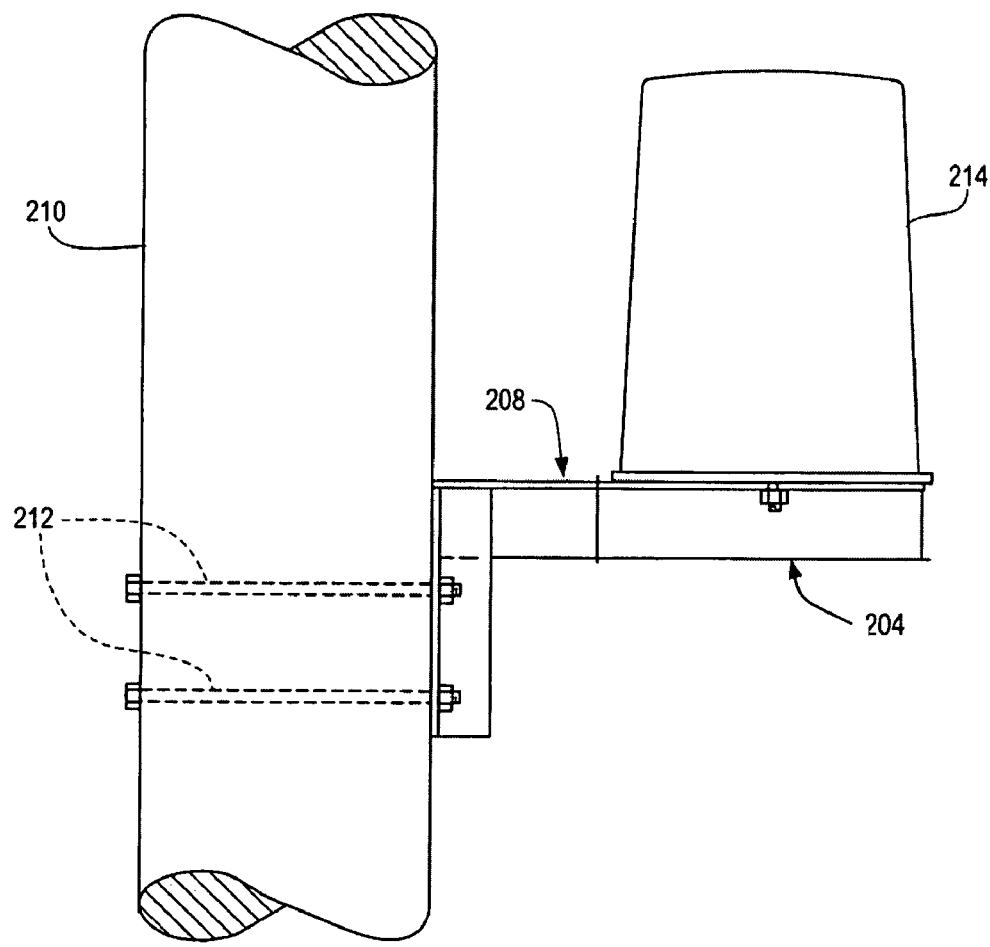
FIG. 11 illustrates plan and elevation views of an installation of the support bracket on a pole.
Figure 11:
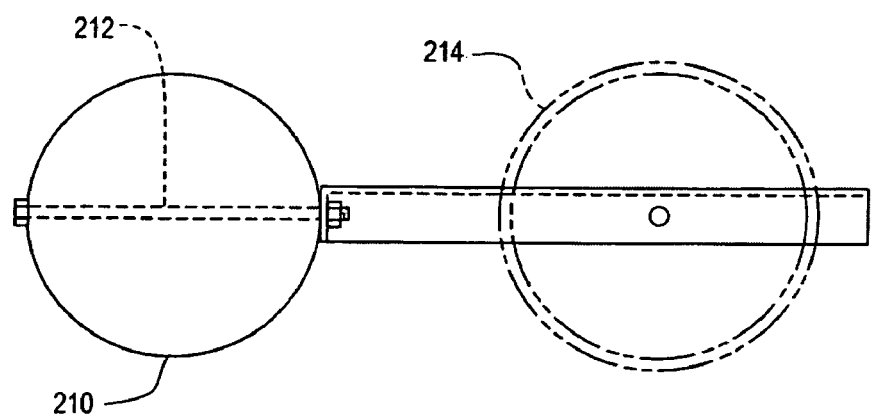
Figure 12:
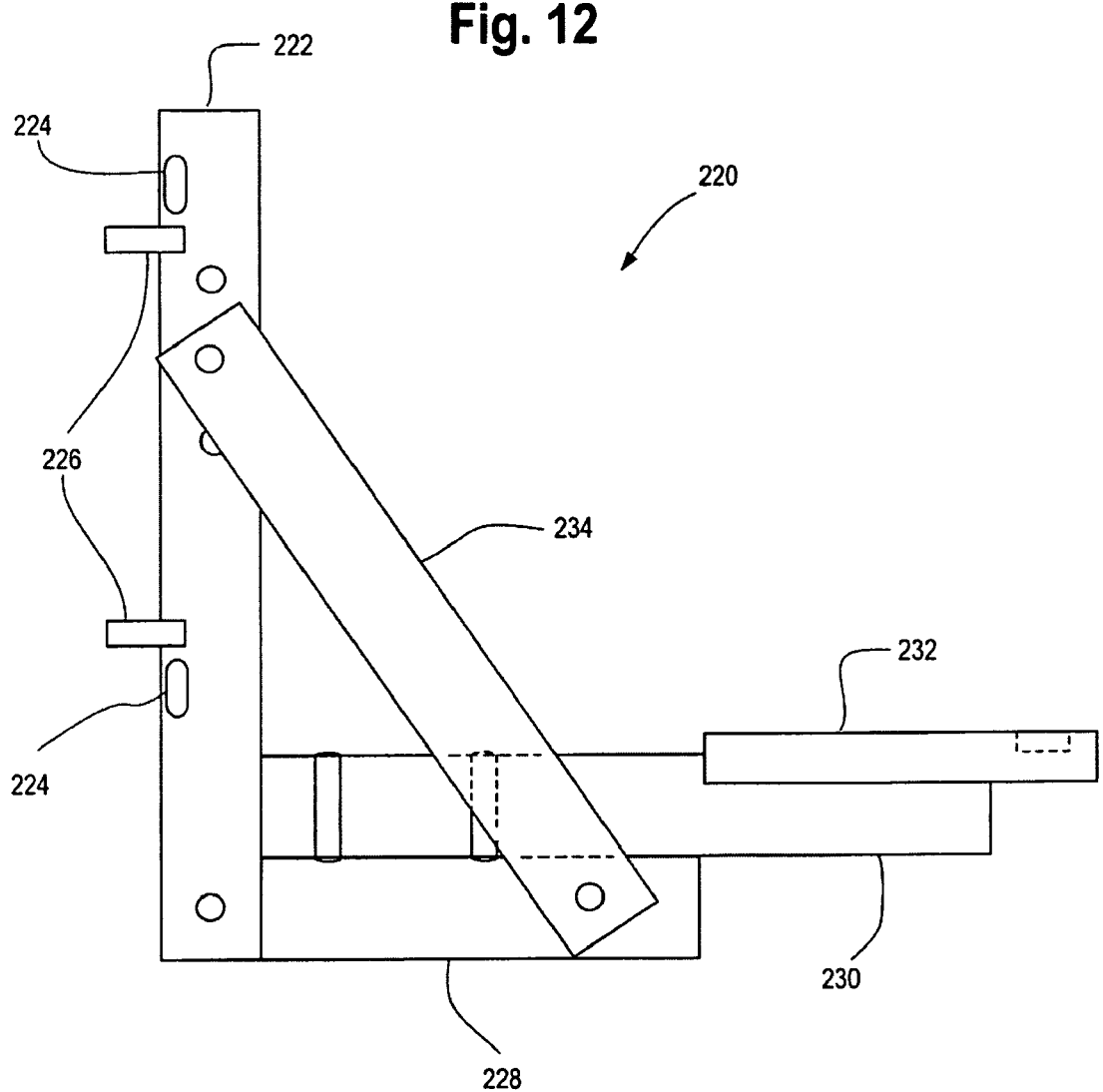
FIG. 12 illustrates an alternate embodiment of a support bracket that may be used to install an antenna on a pole.

FIG. 11 illustrates plan and elevation views of the installation of the support bracket 204 on a pole 210 using bolts 212 with washers and nuts. A dual band omni-directional antenna 214 is illustrated to be installed on top surface 208 of the support bracket. FIG. 12 illustrates an embodiment of an alternate support bracket 220 that may be used to install an antenna on a pole. The support bracket 220 may be installed on top of a pole or on the side of a pole. The support bracket 220 is designed in a manner so that when an antenna is installed using the support bracket 220, it is capable of withstanding high level winds. This is very important in areas where the antenna may be exposed to high winds or where there is a government regulation that requires the brackets to support antennas against high wind pressure.

Figure 13:
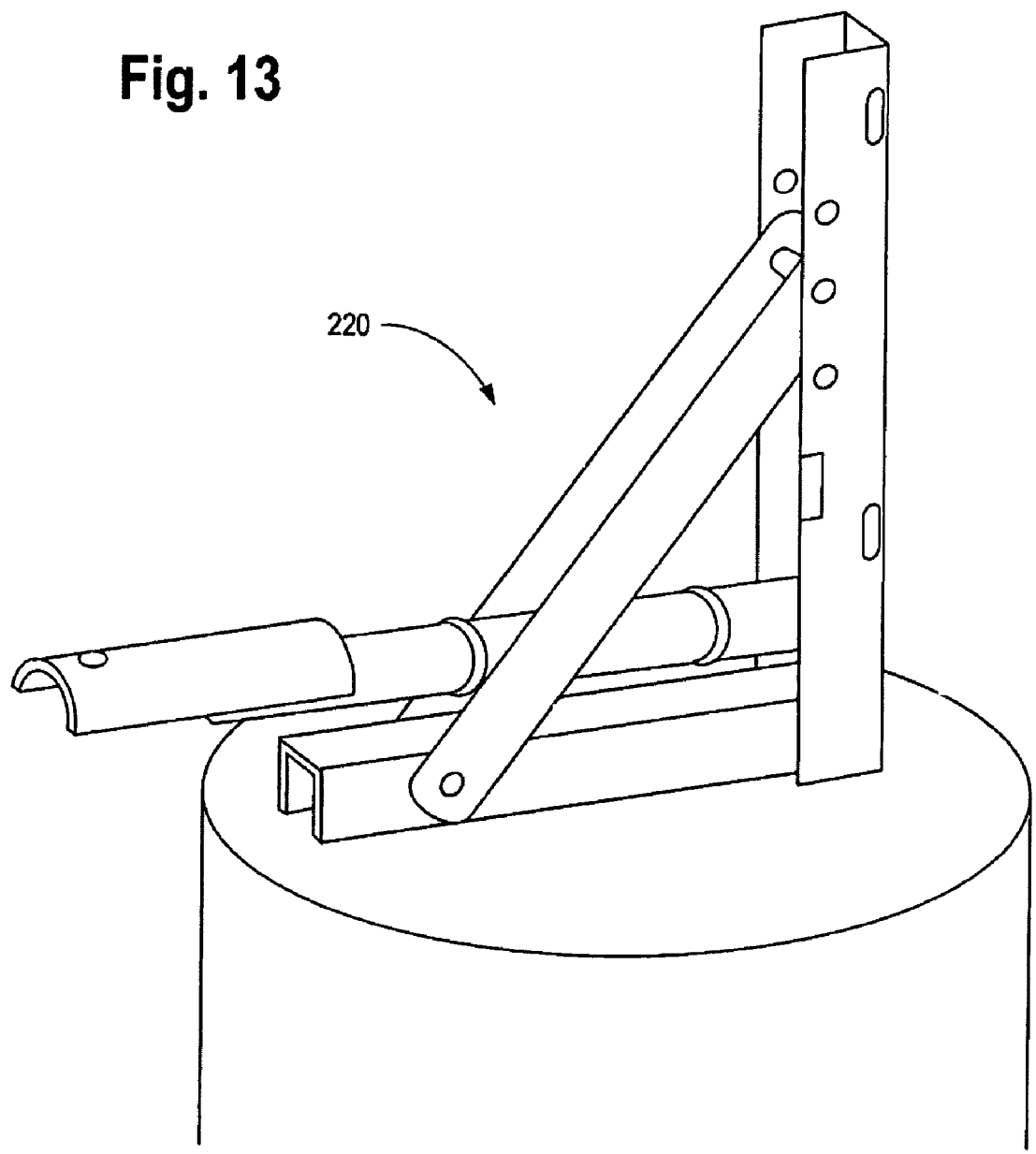
FIG. 13 illustrates an alternate view of the support bracket of FIG. 12.

The support bracket 220 includes a vertical arm 222 that may be attached to a pole using slotted holes 224 and the welded clips 226. A horizontal arm 228 perpendicular to the vertical arm 222 supports a cylindrical arm 230 that may be used to carry an antenna seat 232. The antenna seat 232 may be rotated at various angles to the cylindrical arm 230 so that the antenna may be adjustably down-tilted in relation to the pole, if necessary. Additionally, the antenna seat 232 may also be slid horizontally along the cylindrical arm 230 so as to support antennas at various distances from a pole. An angular arm 234 is provided to support that vertical arm 228 and the cylindrical arm 230. The cylindrical arm 230 may be secured to the vertical arm 228 using clamps 236 with cradle and nuts. FIG. 13 illustrates an alternate view of the support bracket 220.

Figure 14:
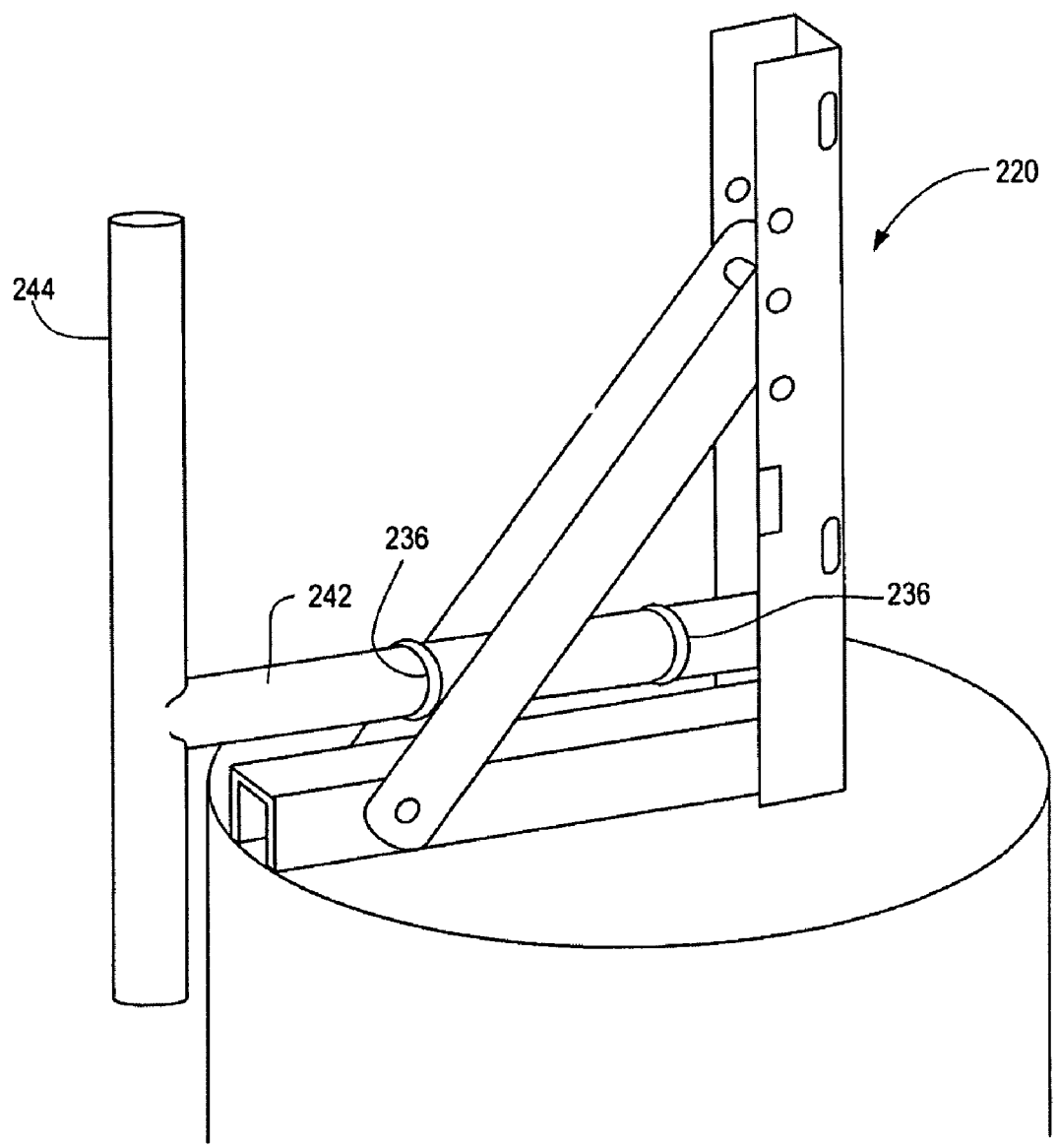
FIG. 14 illustrates another embodiment of a support bracket that may be used to install an antenna on a pole.

FIG. 14 illustrates yet another embodiment of the support bracket 220 in which the support bracket 220 includes a T-bar 242 that may be used to install an antenna. The T-bar 242 is supported using clamps 236 with cradle and nuts. The T-bar may be installed so as to swivel around a swiveling axis 244, thus allowing an antenna installed using the T-bar to be rotated around the axis to achieve desired azimuth adjustment and/or focus.

Figure 15:
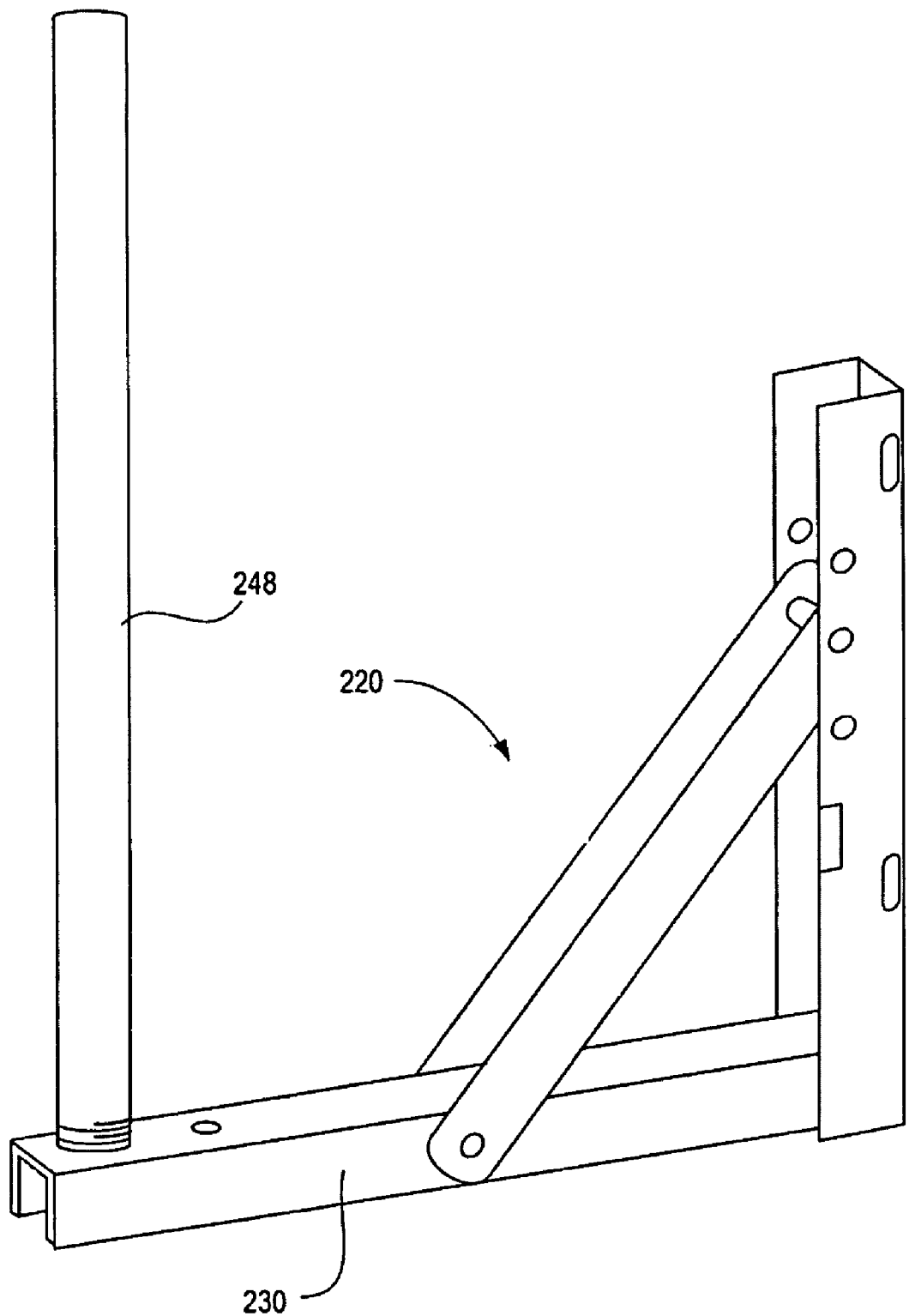
FIG. 15 illustrates yet another embodiment of a support bracket that may be used to install an antenna on a pole.

Now referring to FIG. 15, yet another embodiment of the support bracket 220 includes a support bar 248 that may be installed vertically on the horizontal arm 230 so as to attach an antenna securely to the support bracket 220. In an alternate embodiment, an antenna installed using the support bracket 220 may be covered by a radom so that the antenna is protected and cannot be seem to be on top of a utility pole, etc. Using such radom allows the antenna to be aesthetically as non-obtrusive as possible. To make an antenna located on a utility pole even further non-obtrusive, in an alternate embodiment of the distributed antenna system described herein, such an antenna may be integrated into the pole structure of a utility pole. For example, such integration may be achieved by carving space of a bracket into the utility pole, and installing an antenna on such carved in bracket.

As one of ordinary skill in the art would appreciate, the examples given illustrate the content of the invention without limiting its scope only to the examples described. In view of the many possible embodiments to which the principles of this patent may be applied, it should be recognized that the embodiments described herein with respect to the drawing figures are meant to be illustrative only and should not be taken as limiting the scope of patent. For example, for performance reasons one or more components of the method of the present patent may be implemented in any of various alternate manners well known to those of ordinary skill in the art. Therefore, the patent as described herein contemplates all such embodiments as may come within the scope of the following claims and equivalents thereof.

What is claimed is:

1. A distributed antenna system for providing wireless communication, the system comprising:
 a base station hotel having a plurality of base transceiver stations, each of the plurality of base transceiver stations receiving and transmitting radio frequency signals;
 a plurality of antennas located remotely from the base station hotel and communicatively connected to the base station via a fiber optic cable; and
 an optical conversion equipment adapted to (i) receive signal from and transmit signal to the plurality of base transceiver stations, (ii) convert the signal received from the base transceiver stations into optical signal, (iii) receive optical signal from one of the plurality of antennas, and (iv) convert the optical signal and communicate the converted signal to one of the plurality of base transceiver stations,
 wherein each antenna of the plurality is attached to a cable-span suspended over a roadway between a respective pair of utility poles, each respective pair of utility poles comprising two utility poles situated on opposite sides of the roadway from each other, and the respective pairs of utility poles being spaced apart along a length of the roadway so as to distribute the plurality of antennas over and along the length of the roadway,
 and wherein each antenna comprises two directional antenna elements oriented to face in opposite directions along the length of the roadway, thereby providing wireless coverage in the opposite directions along the length of the roadway.

2. The distributed antenna system of claim 1, wherein at least one antenna attached to the cable-span further comprises an omni-directional antenna element.

3. The distributed antenna system of claim 1, wherein at least one antenna attached to the cable-span is attached to two steel braided cables.

4. The distributed antenna system of claim 1, wherein at least one antenna attached to the cable-span is attached using a bracket adapted to provide at least one of (1) adjustable down-tilt, (2) azimuth adjustment, and (3) stability to the antenna.

5. The distributed antenna system of claim 1, wherein the cable-span comprises a lift strand and a messenger strand, each suspended between the first pair of utility poles, and wherein the messenger strand is configured to carry a communication cable connected to the at least one antenna.

6. A method of providing communication between a wireless carrier's network and a consumer wireless device, the method comprising:

receiving a communication signal from the carrier's network at a base station hotel;

converting the signal received from the carrier's network into an optical signal;

transmitting the optical signal to a plurality of distributed remote antenna nodes, wherein each antenna node of the plurality is attached to a cable-span suspended over a roadway between a respective pair of utility poles;

converting the optical signal into a wireless signal for transmission by the at least one antenna node; and communicating the wireless signal to the consumer wireless device using the at least one antenna node, wherein each respective pair of utility poles comprises two utility poles situated on opposite sides of the roadway from each other, and the respective pairs of utility poles are spaced along a length of the roadway so as to distribute the plurality of antenna nodes over and along the length of the roadway, and wherein each antenna node comprises two antenna elements oriented to face in opposite directions along the length of the roadway, thereby providing wireless coverage in the opposite directions along the length of the roadway.

7. The method of claim 6, wherein at least one antenna node is attached to the cable-span by way of an antenna mounting bracket.

8. The method of claim 6, wherein at least one antenna node further comprises an omni-directional antenna element.

9. The method of claim 6, further comprising installing a radom around at least one antenna node.

\* \* \* \* \*